United States Patent
Brenner et al.

[15] 3,676,386

[45] July 11, 1972

[54] GASKET-FORMING SOLVENT-BASED COMPOSITIONS CONTAINING STYRENE-BUTADIENE BLOCK COPOLYMERS

[72] Inventors: Mannie Brenner, Cambridge; Fred L. Chase, Arlington; Arthur J. Leydon, Waltham, all of Mass.

[73] Assignee: W. R. Grace & Co., Cambridge, Mass.

[22] Filed: Jan. 5, 1970

[21] Appl. No.: 801

[52] U.S. Cl..............................260/27, 260/28.5, 260/32.8, 260/33.6, 260/41, 260/41.5, 260/876, 260/886
[51] Int. Cl. .........................................................C08d 9/12
[58] Field of Search..............260/27 BU, 876 B, 880 B, 33.6, 260/41, 41.5, 28.5 A, 32.8

[56] References Cited

UNITED STATES PATENTS

| | | | |
|---|---|---|---|
| 2,864,882 | 12/1958 | Snell | 260/27 |
| 2,903,439 | 9/1959 | Wolf | 260/27 |
| 3,441,530 | 4/1969 | Bauer | 260/876 |
| 3,459,830 | 8/1969 | Legge et al. | 260/876 |
| 3,519,585 | 7/1970 | Miller | 260/876 |

*Primary Examiner*—Donald E. Czaja
*Assistant Examiner*—William E. Parker
*Attorney*—Theodore C. Browne, Metro Kalimon, C. E. Parker, William L. Baker, Armand McMilland and Lawrence S. Cohen

[57] ABSTRACT

Gasket-forming compositions based on styrene-butadiene block copolymers blended with a minor portion of random styrene-butadiene copolymer and polyisobutylene are prepared by conventional rubber compounding techniques in the presence of low molecular weight polyethyethylene. Fillers and solvents are used to complete the formula.

7 Claims, No Drawings

GASKET-FORMING SOLVENT-BASED COMPOSITIONS CONTAINING STYRENE-BUTADIENE BLOCK COPOLYMERS

THE PRIOR ART

Compositions containing natural or synthetic rubber dispersed or dissolved in a volatile organic solvent have found widespread use in the manufacture of "flowed-in" gaskets for container closure. In preparing these gaskets, a band of the fluid composition is deposited through a nozzle into the sealing area of the closure. Thereafter, the deposit is converted into a solid sealing mass by drying and, in some cases, subsequent curing.

In addition to rubbers and volatile organic liquids, the gasket-forming compositions of the art contain relatively large quantities of filler and occasionally, when desired, a curing agent. Functions of this filler include modification of the flow characteristics of the fluid composition, toughening and hardening of the gaskets, increase of abrasion and tear resistance, and improved performance with respect to oxidation, moisture, solvents and certain chemicals.

The improvement of filled rubber composition has also been favored by the employment of rubber compounding techniques to produce, in concert with the proper selection of fillers, stable non-settling or fully redispersible compounds which could not be obtained by simple mixing techniques. The relative stability of such compositions not only facilitates their redispersion when necessary before use, but also frees the high speed closure lining operation from interruptions caused by nozzle clogging due to aggregated materials.

The rubbers that have conventionally been used in this type of composition are elastomeric in properties and have thus lent themselves to rubber handling techniques. Not so for the new block copolymers of styrene and butadiene which are thermoplastic. When mixed with fillers alone, these new polymers cannot be successfully processed in a Banbury mixer in that, under the condition prevailing in such an operation, they become thermoplastic and stick to the blades and walls of the equipment. Also, on cooling, a hard mass is formed that cannot be easily milled.

Thus, an object of this invention is to provide a novel gasket-forming composition based on styrene-butadiene block copolymers. Another object is to provide a composition of thermoplastic block copolymers that can be successfully handled by rubber compounding techniques. Still another object is to provide a rubber composition that can be highly diluted with resin and retain satisfactory sealing properties.

SUMMARY OF THE INVENTION

These objects, as well as others which shall become apparent in the course of the detailed description of the invention, have been accomplished by formulating thermoplastic styrene-butadiene block copolymers with a minor amount of conventional styrene-butadiene elastomeric copolymer and polyisobutylene, and with a low molecular weight slightly oxidized polyethylene. Conventional rubber fillers, solvents and miscellaneous additives complete the formula.

It has been found that a composition of this type, although based on a thermoplastic elastomer, can be successfully processed in a Banbury mixer to yield a homogeneous closure sealing compound. This is a rather unexpected development in view of the plasticity of the block copolymers at the temperatures prevailing in Banbury mixers and rubber milling equipment.

DETAILED DESCRIPTION OF THE INVENTION

The compositions of this invention as well as the method employed to prepare them are represented by the following examples. These examples are given for illustrative purposes only and, as such, they are not intended to limit the invention to a scope different from that expressed in the claims which follow this specification.

EXAMPLE 1

A sealing composition is prepared with the following ingredients in the proportions indicated:

| Ingredient | Parts by weight |
| --- | --- |
| 1. Styrene-butadiene block copolymer | 81.0 |
| 2. Styrene-butadiene random copolymer | 27.0 |
| 3. Polyisobutylene | 13.5 |
| 4. Carbon black masterbatch | 1.1 |
| 5. Polyethylene | 20.2 |
| 6. N,N'-di-$\beta$-naphthyl-p-phenylenediamine (antioxidant) | 2.7 |
| 7. Titanium dioxide pigment (opacifier) | 21.6 |
| 8. Resin (Ester Gum) | 40.5 |
| 9. Calcined clay, sp. gr. 1.8 | 142.6 |
| 10. Styrene-butadiene block copolymer | 148.6 |
| 11. Resin (Ester Gum) | 331.9 |
| 12. Isoheptane (to 54% total solids) | 830.7 |

The block copolymer used here is of the polystyrene-polybutadiene-polystyrene type. It has a total molecular weight of about 73,000 with a distribution of 10,000–52,000–10,000 among the three constituent polymeric segments. The random styrene-butadiene copolymer is that classified as SBR 1011 by the International Institute of Synthetic Rubber Producers. It is a hot polymerized copolymer having a Mooney viscosity of 54 (ML-4 min. at 212°F.) and containing about 23.5 percent bound styrene. The polyisobutylene is a medium molecular weight solid with a viscosity average molecular weight (Staudinger) of approximately 70,000.

The carbon black masterbatch consists essentially of a blend of 20 parts of carbon black with 80 parts of a random styrene-butadiene copolymer of a type similar to that already described.

The non-rubber ingredients can be characterized as follows. The polyethylene is a material with a molecular weight of about 7,000, a ring-and-ball softening point of about 106°C. and a saponification number of 5.0. The ester gum employed is a standard glycerol ester of tall oil rosin having a melting point of 89° to 92°C., a specific gravity of 1.095 and an acid number of 7. The calcined clay is a low specific gravity white aluminum silicate having an average particle size of 1 micron, a bulking value of 0.0666, a screen residue (wet) of 0.009 at 200 mesh, a pH of 4.3 and a refractive index of 1.625. The other non-rubber components of the formulation are conventional materials for this type of application and need no further description.

The above described ingredients were mixed together by standard rubber compounding techniques. To accomplish this, ingredients 1 through 9 are placed in a Banbury mixer operated at high speed, ram down, with cooling water. After about 1.5 to 3 minutes, the mixture is dumped out at a temperature of 270°F. The mass is then milled on a two-roll rubber mill in a period of 5 minutes. The sheet obtained is chopped and fed to the solvent mixer where the rest of the block copolymer and resin (items 10 and 11 of the formula) are added and mixed in with the isoheptane.

The resulting rubber composition is suitable for use in high speed closure lining machines.

EXAMPLE 2

The formulation of Example 1 was employed with the addition of 2.2 parts by weight of a high molecular weight polyethylene glycol having a viscosity of about 3,700 Saybolt seconds at 210°F. Among other advantages derived from its presence, this material greatly facilitated the milling of the Banbury batch by preventing the mass from moving to the back roll of the rubber mill.

EXAMPLE 3

The formula of Example 1 was once again employed with the difference that the block copolymer was replaced by another styrenebutadiene block copolymer having a molecular weight of about 150,000 with segments of 20,000, 110,000 and 20,000 respectively. This new formula was processed without difficulty in the conventional manner and yielded a satisfactory non-settling gasket-forming compound.

As illustrated by the examples, it is thus possible to treat block copolymers of styrene-butadiene by rubber compounding techniques, provided that certain substances are present during said treatment. These substances shall be reviewed in greater detail.

Beginning with the block copolymers themselves, it should be noted once more that they are thermoplastic elastomers composed of polystyrene segments tacked onto a polybutadiene core. A molecule of such compound can be represented as Z—X—Z wherein X is the polybutadiene core and Z stands for polystyrene fragment. These elastomers possess a gradation of properties ranging from those of relatively homogeneous polystyrene to those of relatively homogeneous polybutadiene. The block copolymers of interest here are those which contain sufficient polybutadiene to behave as an elastomer at ambient temperatures, when the polystyrene segments are physically crosslinked, and sufficient polystyrene to become thermoplastic at high temperatures through the breaking of the physical crosslinking bonds. In practice, useful block copolymer may have a polystyrene content of about 10 to 50 percent by weight, an average polybutadiene segment molecular weight within the range of about 25,000 to 300.000 and an average molecular weight of about 5,000 to 50,000 for each polystyrene segment. The preferred copolymers contain about 25 to 30 percent polystyrene by weight and have a molecular weight of about 60,000 to 160,000. The preparation of the block copolymers just described can be found in various patents including U. S. Pat. No. 3,231,635 and British Pat. No. 1,000,090.

The function of the random butadiene-styrene copolymer of the present formulation can be accomplished by any elastomeric random copolymer of styrene and butadiene that is conventionally used in gasket-forming compositions. The preferred materials are of the hot polymerized type, have a Mooney viscosity within the range of 35 to 75 and contain from about 20 to 40 percent bound styrene.

The polyisobutylene used is of the medium molecular weight type having a viscosity average molecular weight (Staudinger) within the range of about 60,000 to 145,000, with the preferred range being about 60,000 to 85,000.

The rubber components that have just been described are used, for the purpose of this invention, in proportions such that the block copolymer is the major component and the random styrene-butadiene copolymer and the polyisobutylene each constitutes at least about 5 percent of the total rubber present. These proportions are not adjusted for the very minor quantity of random copolymer that may be introduced when carbon black is added as one ingredient of a masterbatch.

The compositions of the invention are formed by admixing with the three types of necessary rubbers, up to about 200 parts by weight of non-rubber additives for each 100 parts of rubber. This figure does not include the solvent which is added at the end of the entire operation in a quantity sufficient to achieve the solids concentration desired.

The successful formulation and handling of the present gasket-forming compounds requires a low molecular weight polyethylene, i.e. between about 5,000 and 15,000 in quantities within the range of about 6 to 15 parts per 100 parts rubber. An example of a material suitable for this function is the low molecular weight polyethylene that has already been characterized in Example 1. Its function and that of its near equivalents can sometimes be enhanced by the incorporation of certain polyethylene glycols, such as that used in Example 2, which has a viscosity of about 3,700 Saybolt seconds at 210°F. This type of compound also imparts anti-static properties to the mix. Up to about 10 parts of polyethylene glycol is generally used per 100 parts of polyethylene.

The selection of particulate inorganic substances for the new compositions has a certain importance depending on the composition characteristic desired. The preferred materials, which will render the compositions non-settling, possess a specific gravity within the range of about 1.8 to about 2.3. Their other properties need not differ from those of conventional rubber fillers. The preferred fillers include anhydrous aluminum silicates produced according to U. S. Pat. No. 3,021,195 by a method which removes the bound water of the natural product. From about 35 to 55 parts of such substances is needed per 100 parts rubber. Other inorganic filling materials can also be added for various reasons to affect the density of the compositions and their appearance as well as other physical and chemical properties. Suitable fillers, pigments and opacifiers which may be employed with or in the place of the preferred low specific gravity clay, include such widely used materials as water washed clays, anhydrous particulate silica, carbon blacks, zinc oxide, titanium dioxide, hydrated calcium silicate and the like.

The dual nature of the block copolymers used in the present compositions confers upon them a great affinity for a variety of resins which generally would be compatible with either polystyrene or polybutadiene. In such circumstances, any resin normally used with closure sealing rubber compositions can be used here and in quantities ranging from about 30 to 200 parts per 100 parts rubber. Solid rosin esters having a melting point within the range of 80° to 120°C. are preferred.

Other minor conventional ingredients may also be incorporated into the compositions of the invention. Among these figure most prominently antioxidants and curing agents. Useful antioxidants belong to classes of compounds as varied as the diaryldiamines, the bis-phenols and the phosphites. Examples of suitable members of these and other useful classes include 1,3,5-trimethyl-2,4,5-tris (3,5-ditertiarybutyl-4-hydroxybenzyl)benzene, polymerized trimethyldihydroquinoline, N,N'-dinaphthyl-p-phenylenediamine, 4,4'-methylenebis (2,6-ditertiarybutyl phenol), 2,2'-methylenebis(4-methyl-6-tertiarybutyl phenol), zinc dibutyldithiocarbamate, butylated hydroxy anisole, 4,4'-butylidenebis(6-tertiarybutyl-3-methylphenol), trinonylphenylphosphite, polymerized trinonylphenylphosphite and tri(mixed mono-and dinonylphenyl) phosphite. Furthermore, there may be added to the compositions in the event that irreversible chemical crosslinking of the polybutadiene segments of the block copolymers is desired, any of the usual vulcanizing agents including such substances as sulfur heat reactive phenolic resins, p,p'-dibenzoylquinedioxime, 4,4'-dithiodimorpholine, aliphatic polysulfide polymers, tetrachlorobenzoquinone and the like.

Finally, the nature and the quantity of liquid that must be employed to complete the formulation must vary somewhat with the particular formulation devised and with the use intended, especially the type of machine and drying conditions employed in the ultimate application. In general, the selected liquid should constitute from about 25 to 70 percent, and preferably about 40 to 60 percent, of the total weight of the composition. Suitable liquids are those which act as good vehicles for the system and leave no objectionable residue on evaporation under the coating conditions. The list includes benzene, toluene, xylene, ethyl acetate, methyl ethyl ketone, acetone, hexane, isoheptane, octane as well as various mixtures of these liquids.

It is apparent from the foregoing partial enumeration of additives that a great variety of formulations can be designed for closure sealing compositions and for other sealing or coating applications without departing from the concept of the present invention as defined by the following claims.

What is claimed is:

1. A liquid gasket-forming composition comprising:
   A. One hundred parts by weight of a rubber mixture consisting of (1) a major proportion of a block copolymer of styrene and butadiene having the structure Z-X-Z wherein Z is styrene and X is butadiene and wherein each Z has an average molecular weight between about 5000 and 50,000 and X has an average molecular weight between about 25,000 to 300,000, the total weight of the Z blocks constituting from about 10 to 50 percent of the total copolymer weight; (2) a minor proportion, constituting at least 5 parts, of a random styrene-butadiene copolymer having a Mooney viscosity within the range of about 35 to 75 and a bound styrene content of about 20 to 40 percent by weight; and (3) a minor proportion, constituting at least 5 parts, of a polyisobutylene having an average molecular weight within the range of about 60,000 to 145,000;

B. Up to about 200 parts of additives comprising at least about 6 to 15 parts of a slightly oxidized polyethylene having a molecular weight within the range of about 5,000 to 15,000; and C. Enough organic liquid solvent to adjust the solids content at about 30 to 75 percent by weight.

2. The composition of claim 1 wherein the average molecular weight of the block copolymer is within the range of about 60,000 to 160,000 and the styrene content within the range of about 25 to 30 percent by weight, said styrene being distributed about equally in the two Z segments of the molecules.

3. The composition of claim 1 wherein the polyisobutylene has a molecular weight within the range of about 60,000 to 85,000.

4. The composition of claim 1 wherein about one part of a solid water-soluble polyethylene glycol is added per 10 parts of the polyethylene.

5. The composition of claim 1 wherein a calcined clay having a specific gravity of about 1.8 to 2.3 is employed at the rate of about 35 to 55 parts per hundred parts of rubber.

6. The composition of claim 1 wherein from about 30 to 200 parts of a solid rosin ester is used for each 100 parts of rubber mixture.

7. The composition of claim 1 containing about 40 to 60 percent organic liquid solvent by weight.

* * * * *